United States Patent [19]

Hildebrand

[11] Patent Number: 5,153,858
[45] Date of Patent: Oct. 6, 1992

[54] METHOD FOR FINDING HORIZONS IN 3D SEISMIC DATA

[75] Inventor: Harold A. Hildebrand, Houston, Tex.

[73] Assignee: Landmark Graphics Corporation, Houston, Tex.

[21] Appl. No.: 727,410

[22] Filed: Jul. 9, 1991

[51] Int. Cl.⁵ .............................................. G01V 1/30
[52] U.S. Cl. ........................................ 367/72; 367/73
[58] Field of Search ................. 364/421; 367/59, 60, 367/68, 72, 73

[56] References Cited

U.S. PATENT DOCUMENTS

| 4,633,448 | 12/1986 | Koeijmans | 367/72 |
| 5,056,066 | 10/1991 | Howard | 367/72 |

Primary Examiner—Ian J. Lobo
Attorney, Agent, or Firm—Dodge, Bush, Moseley & Riddle

[57] ABSTRACT

A method of rapidly generating horizon maps from a three dimensional volume of seismic traces is disclosed. During batch processing of the digital data representing trace wavelets, "1"'s or "0"'s are determined for each seismic trace of the volume. A "1" at a depth of a trace indicates that a horizon exists at that depth and at other depths of "1"'s of adjacent traces which are within a predetermined depth. In a real time mode, an explorationist selects a seed point thereby identifying a "1" on a particular trace at a particular depth. An automatic scanning procedure finds all other "1"'s at depths of adjacent traces. Each found "1" of adjacent traces is redesignated a seed point and the process is continued until no more "1"'s can be found. A horizon map is created from the depths of each found "1". A record is maintained of parent and child bits whereby seed bits are designated as parent bits and each found bit is designated a child bit. Such parent-child information is useful in editing of horizon maps created by the method. Numerical attributes of the wavelets at the depths of the 1 bits are stored as a function of the depths of the bits, thereby reducing required storage space.

15 Claims, 4 Drawing Sheets

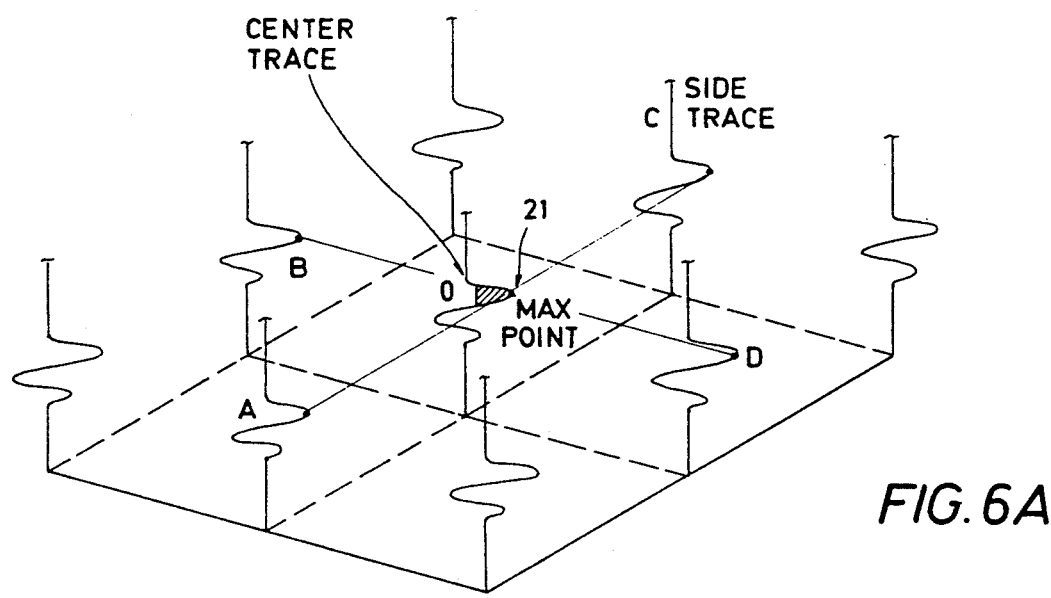
FIG. 6A
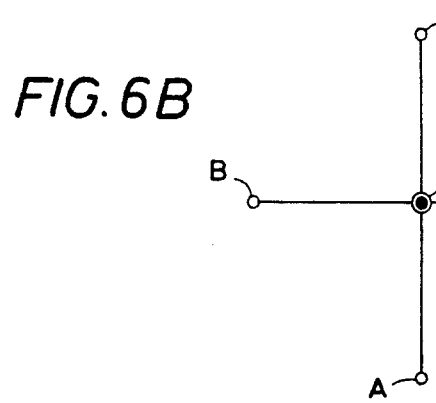
FIG. 6B
FIG. 7A
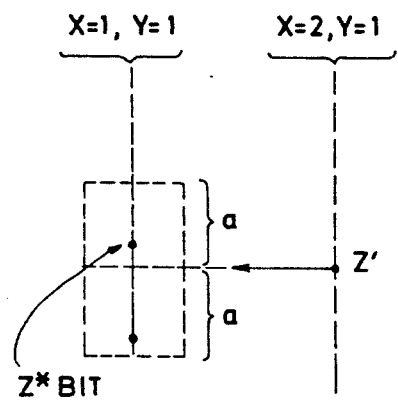
FIG. 7B
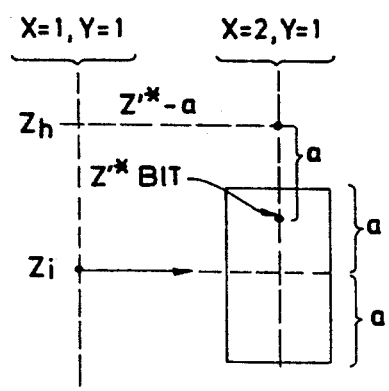

METHOD FOR FINDING HORIZONS IN 3D SEISMIC DATA

BACKGROUND OF THE INVENTION

1. Field of the Invention

This invention relates generally to the field of seismic data interpretation. In particular the invention relates to a machine process for selection of three-dimensional (3D) seismic data to provide petroleum exploration professionals more detailed understanding of subsurface geology and geometry. Still more particularly, this invention is an automated method of "picking" or "tracking" individual seismic events or horizons through a three-dimensional volume of data with extreme accuracy and extreme speed.

2. Description of the Prior Art

FIG. 1 through 4 of the Drawings illustrate features and methods associated with the prior art picking methods; FIGS. 5 through 8 illustrate features and methods of the invention. Only Figures associated with prior art methods are introduced here.

FIG. 1 illustrates a portion of a hypothetical 3D seismic data volume in order to explain the three-dimensional relationships discussed in the test and accompanying drawings in this specification;

FIG. 2 is an isometric view of a portion of five seismic traces which illustrates the relationship between a "seed point" and its four adjacent traces;

FIG. 3 illustrates a prior art automatic tracking method; and

FIG. 4 illustrates a prior art "iterative" autotracking method.

FIG. 1 is an isometric view of a portion of a hypothetical three-dimensional (3D) seismic data volume. The small circles at the top of the volume represent the surface location of individual traces. The vertical lines represent seismic traces which are measured in 2 way travel time along the z-axis of the volume. Such travel is related to the distance or depth into the earth at which a wavelet is generated. Each individual trace is an amplitude versus time representation of acoustic reflections from strata in the earth.

The graphical view of FIG. 1 is merely a visual representation of the manner in which each seismic trace is actually represented. Each trace is stored as a sequence of digital numbers representing the amplitude of the trace about a zero value. Each number uses many "bits" (a bit is a binary digit having values $\phi$ or 1) to adequately represent the number which corresponds to the amplitude. Eight, sixteen or thirty-two bits are often used. Of course, such bit representations are repeated for each time point, for example at 2 or 4 milliseconds (m sec) intervals for six total seconds.

A horizontal section or time slice is a horizontal slice or plane through the 3D volume of data. It illustrates different strata at a common time. On the other hand, a horizontal map, or simply a "horizon" is obtained by plotting an attribute of a particular wavelet (usually time of the wavelet, but sometimes maximum or minimum amplitudes) on x-y axes. It is similar to a surface topographic map, but of course such a plot is of subsurface strata. The horizontal attribute may be illustrated by colors or by line contours etc.

In less than ten years, computer aided exploration revolutionized seismic exploration and field development. Until recently, however, one aspect of seismic interpretation—picking subsurface horizons, or simply, "picking", remained essentially unchanged from paper and pencil methods to automatic computer picking methods.

Traditionally, picking was done manually by drawing with colored pencils on paper, one seismic section or line at a time—an incredibly tedious process. In the early 1980's, interactive CAEX (an acronym for Computer Aided Exploration) workstations gave seismic explorationists the ability to pick 3D data more quickly and effectively. While interpreting seismic lines (that is, a two-dimensional vertical slice or a "vertical seismic section") was still accomplished by viewing and picking one line at a time, it could then be done by using a mouse in combination with a display screen and clicking the cursor on a few selected points along a horizontal and letting the machine pick all the rest of the points on that line. This was the first type of automated picking, and represented an incremental increase in both productivity and accuracy over manual picking.

In one prior art automatic system for tracking a bedding plane (or strata or simply "horizon") in a substantially horizontal direction through a 3D volume of data, a user selected or "input" at least one "seed point", which then "expanded" in all four directions within the 3D data volume as illustrated in FIG. 2 until it reached the boundaries of a user specified zone. Users had the option of tracking seismic data in one of two modes.

A "seed point" is specified by its x and y location and its time or depth (i.e., the x-axis of FIG. 1). It is also specified by a characteristic of the reflection at that point. Such characteristic is usually the maximum amplitude of the reflection at that location in the volume of the data. Other characteristics, such as minimum amplitude, phase, frequency, etc., of the reflection at the x, y, z point may be used. As illustrated in FIG. 3, non-iterative tracking searched the seismic traces adjacent seed points for similar amplitude values, picked the best one, then proceeded to the next available trace without double-checking the accuracy of the pick.

An iterative picking mode verified an adjacent trace as a pick by cross-referencing the previous trace. Once verified, the adjacent trace was treated as a seed point and the picking of adjacent traces from it proceeded. FIG. 4 illustrates such prior art iterative picking. Verification means that if the amplitude of the picked trace is within the limits of tolerance set by the user, the pick is accepted. Users could specify (on a scale of 1-10) the degree of amplitude similarity they would allow. If a pick did not pass this acceptance test, it was designated "dead" until at least one directly adjacent trace matched sufficiently to accept it.

More specifically, once a seed point is selected on a trace, the trace is scanned up and down the z or time axis to find the local extreme amplitudes or simply "extrema". A local extremum of a variable $x_i$ where i is a digitizing index, is defined as $x_{i-1} < x_i \geq x_{i+1}$ or $x_{i-1} > x_i \leq x_{i+1}$.

Such scanning is bounded by zero crossings of the amplitude of the trace in the case of a peak or a trough. Such extremum will typically vary with time a small amount. For example, if $T_0$ represents the seed point, $T_i$ would typically represent the time of the extremum. Next, the time $T_0$ is started on the target trace. On it, the time is varied up and down between zero crossings of its trace amplitude until the nearest extremum $T_2$ is found. Finally, the time $T_2$ is used on the trace on which the seed point exists and on such "seed" trace scanning up and down the "z" axis is again performed for the nearest extremum $T_3$. If $T_3$ equals $T_b$ then iterative tracking has been achieved and tracking continues.

The acceptance test tolerance of the prior art iterative tracking defined a function, $$S = \left| \frac{A_t - A_s}{A_t + A_s} \right|$$

where $A_t$ = Amplitude from the target trace at $T_2$, and
$A_s$ = Amplitude from the seed point at $T_1$.

The value of S is bounded by values of 0 and 1. The more similar the two amplitudes, the closer the S function is to zero. The more dissimilar the two amplitudes, the closer the S function is to 1. Next, a score function is evaluated:

SCORE = (S*9.0) + 1.

The score is compared with a control value from 1 to 10 selected by the interpreter or user of the data. Scores greater than the control value prevent a target trace from being picked.

The prior art techniques described above must process extremely large amounts of data in order to produce or pick a horizon map. Not only must the picking procedures be performed, but their performance requires operation on digital data comprising many bits representative of analog seismic signals. As a result, even with very powerful computers in workstations, a geologist or geophysicists who uses a workstation having a horizon picking program for picking 3D volumes must wait until the program picks through the data and performs the above described picking procedures. Such wait may inhibit creativity where a user desires to view multiple horizons in a short time.

Identification of the Objects of the Invention

A primary object of this invention is to provide a method for storing and picking 3D seismic data which produces a horizontal map on user command within a much shorter time, perhaps 10 to 50 times shorter than prior art methods using comparable computing power.

Another object of the invention is to reduce the amount of computer memory required at the time a user desired to pick a horizon, such reduction being at least eight times less required memory.

Another object of the invention is to provide for detection and interactive correction of tracking errors in a manner which is much faster and more convenient to the user than that provided by prior art methods.

SUMMARY

The objects identified above along with other advantages and features of the invention are achieved with the method of this invention by which the bulk of tracking computations for a 3D volume seismic data is performed in advance during a "batch" (non-interactive) processing phase. The results of such batch processing are stored as a "horizon bit volume" in which each seismic value of the original 3D cube of digital data is replaced by a single bit of information. The horizontal bit volume is created by selecting and processing all three by three grids of seismic volume data and assigning a "1" bit to each depth point of a grid's center trace for which a horizontal indicator or "characteristic" can be picked according to a local horizontal picking method. Such characteristic may be a maximum amplitude of a wavelet, a minimum amplitude of a wavelet or other attribute such as zero crossing, frequency, etc. Next, each local horizon represented by a "1" bit of a center trace at a particular depth point is coordinated with its neighboring traces so as to establish continuity of a local horizon from one local horizon at a depth of a center trace to a local horizon of a center trace of its adjacent neighbor. A final bit volume results which, when later is accessed in an interactive phase, produces horizons starting from any bit in the volume as a seed point. Such horizons which result from scanning of the final bit volume are substantially the same as achieved if horizon picking were being done with the original eight-bit volume of seismic data.

A method of storing attribute information corresponding to each on or "1" bit of the final bit volume is also provided.

During the interactive phase, a user accesses only the final bit volume, instead of the original seismic volume data. The volume of data may be stored in RAM memory of a computer, rather than on disk as required by prior art. The scanning of the final bit volume produces a horizontal map from a seed point. It proceeds so rapidly that a user can produce a horizon map on a monitor apparently instantaneously. A record of the path through the bit volume is maintained so that if an erroneous portion of the final map is detected, a user may identify and eliminate that portion of the final horizon map.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIGS. 6A and 6B illustrate a method to identify whether or not a characteristic of a wavelet at a particular depth is on a local horizon for the purpose of deciding whether or not a bit is to be set in the candidate bit volume, FIGS. 7A and 7B illustrate testing procedures in the creation of a final bit volume to insure that a horizon is produced when later scanning of the bit volume is performed from any bit in the bit volume.

DESCRIPTION OF THE INVENTION

The method of this invention is divided into two phases. The first phase is a batch (non-interactive) data processing phase where three-dimensional seismic trace data are first processed over small test areas to find "candidate bits" representative of local horizons. Such "candidate bits" are then processed in a "scanner" procedure to assure that local horizons which are next to one another match at their common boundaries. The final result is a final bit volume where each trace is converted to a series of 0 and 1 bits as a function of depth to represent all horizons. The 1 bits are placed at the depth of every bedding plane or "horizonal" throughout the volume of seismic data. A horizon is defined as a horizontally continuable characteristic of the earth formation and is usually a peak or trough of a wavelet of the seismic traces. A wavelet of a trace often represents reflections from subterranean earth strata. Other attributes or characteristics may be used other than peaks or troughs, but the remainder of this specification will be limited to such characteristics.

The second phase is an interactive phase where, the final bit volume is loaded into the RAM memory of a computer aided exploration workstation. The user first selects a two dimensional seismic line which is displayed on a monitor. The user then moves a cursor to the desired strata (i.e. maximum of a wavelet) and clicks the cursor. Such click identifies the x, y, z coordinates of such one point of the strata. The coordinates are applied to the final bit volume stored in RAM, and a bit stored at such x, y, z coordinates is identified as the seed point for horizontal mapping. Such seed point is used in an automatic picking method (called a "scanner", a similar procedure used to produce the final bits from the candidate bits) to grow such seed point throughout the three dimensional bit volume. A horizon is produced and displayed on the monitor with extreme accuracy and speed. Details of the phases described above follow.

BATCH PHASE

1. Creation of Candidate Bit Volume

Figure 5:
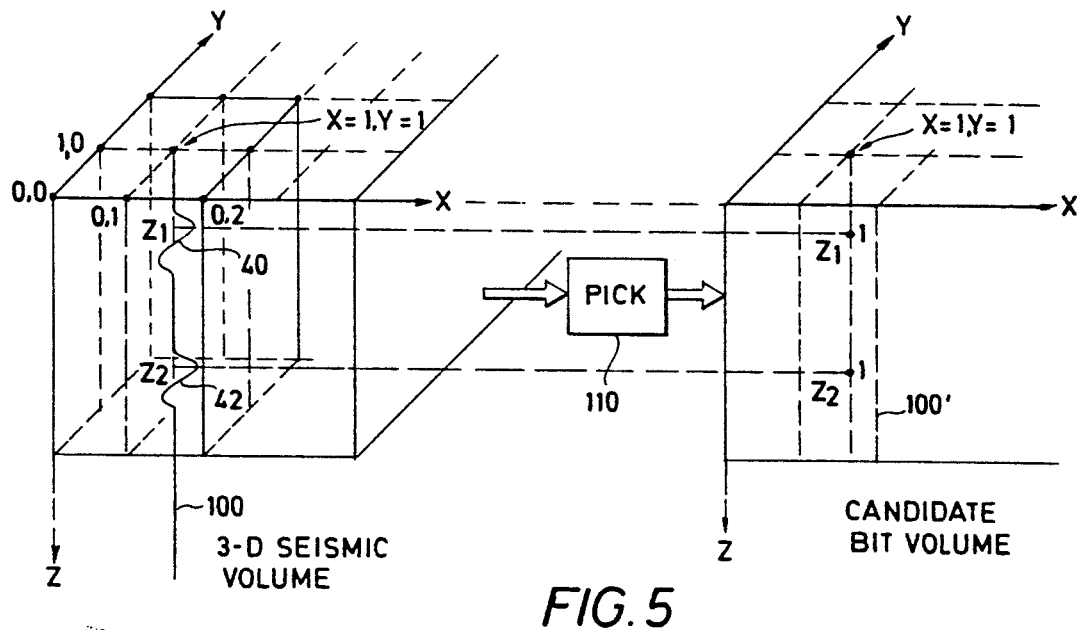
FIG. 5 illustrates a three-by-three volume of traces defined about a center trace which is used to produce candidate bits.

FIG. 5 illustrates the transformation of digital data representative of seismic wavelet amplitudes as a function of depth to corresponding bits, that is, 0's and 1's as a function of depth where 1's are placed at depths where a predetermined characteristic of a wavelet is selected. For example, the 3D seismic volume on the left hand side of FIG. 5 illustrates a three-by-three trace volume about a center trace located at $x=1$, $y=1$ as a function of depth z. Two wavelets 40, 42 are illustrated at depths $z_1$ and $z_2$. Of course, an actual trace may have wavelets.

The three-by-three volume of seismic traces, of which the volume centered at $x=1$, $y=1$ is an example, is processed as a group by a PICK, process or program 110 to produce a center bit trace at $x=1$, $y=1$ as a function of depth. It is assumed that the picking of program 110 verified that the maximum amplitudes illustrated at depth $z_1$ of wavelength 40 and depth $z_2$ of wavelet 42 correspond to separate local horizons through the three-by-three grid of seismic traces. The candidate bit volume on the right hand side of FIG. 5 shows that the center trace at $x=1$, $y=1$ as a function of depth has 1 bits placed at $z_1$ and $z_2$ with all other depths of such trace being represented by zeros. Such procedure may be repeated for all center traces of the 3D seismic volume until the candidate bit volume is entirely filled with 0 and 1 bits. (Alternatively, candidate bits of a center trace may be found and tested with respect to neighboring local horizons to find final bits as processing proceeds.) The Pick program 110 of FIG. 5 as applied to each maximum amplitude of each wavelet of each center trace of each seismic three-by-three bit volume is described below.

2. Determination of candidate bits for each center trace of candidate bit volume The preferred embodiment of the PICK method of FIG. 5 is illustrated in FIGS. 6A and 6B. The method first identifies the maximum wavelet amplitudes for each depth of a center trace of a three-by-three "volume" of traces. Next, a five-trace test set of wavelets to the "south", "west", "north" and "east" (labeled A, B, C, D) of the center trace is selected as illustrated in FIGS. 6A and 6B. The south, west, north and east traces, serve as test traces around the center trace 0 which has a depth z corresponding to the maximum (or some other characteristic, such as the minimum) wavelet amplitude depth point as illustrated in FIG. 6A. The preferred embodiment of the PICK method 110 picks and iteratively verifies all four side traces with respect to the center trace before the max point 0 at depth $=z_1$ is applied as a "1" bit at depth $=z_1$ of the corresponding center trace of the candidate bit volume. If any comparison between the center trace and an adjacent side trace fails to pass a user-specified acceptance limit, the wavelet maximum at depth $=z_1$ is rejected for failure to fall on a local horizon.

Figure 1:
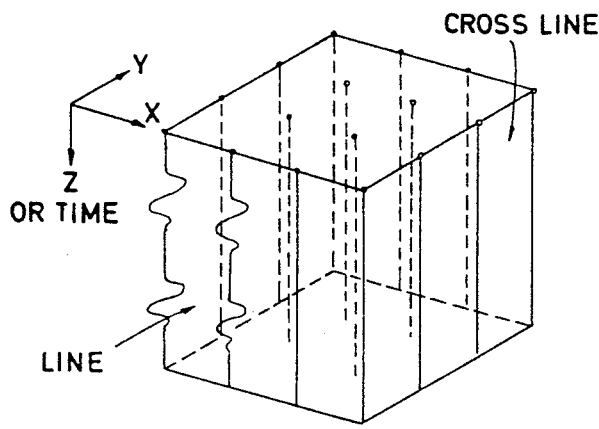
FIGS. 1 through 4 illustrate prior art automatic picking methods and illustrations of a 3D volume of seismic data.
Figure 2:
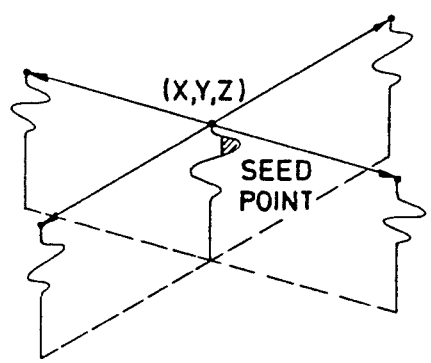
Figure 3:
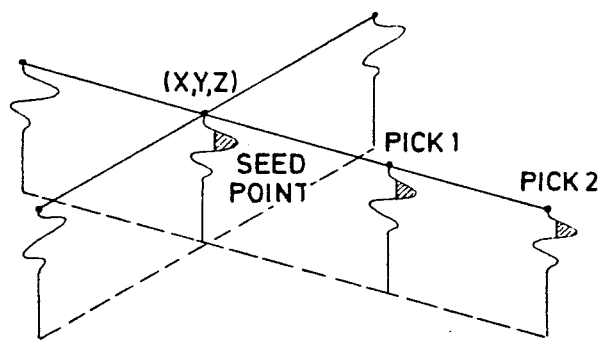
Figure 4:
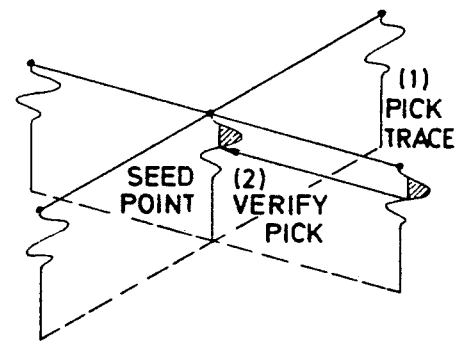

The preferred pick method according to the invention steps through the a multiple trace verification process in a five trace set by picking four adjacent (side) traces (see FIG. 6B) and verifying each of the four points A, B, C and D in exactly the same way as the prior art iterative mode as indicated by FIG. 4. Each iterative verification uses the same user-defined acceptance criteria as described above. A 1 bit is set for the depth point 0 in the candidate bit volume only if all four side traces of the set pass the acceptance tests. When all four side traces pass such tests, any one of four side traces A, B, C and D can be linked back to the center point 0. This "all or nothing rule" insures that the center trace depth point and the selected depths of its side traces actually lie on the same local seismic horizon. Under certain circumstances an "all or nothing rule" is not optimum or necessary, and a relaxed criterion may suffice.

The process described above is repeated for each wavelet of the center trace located at $x=1$, $y=1$. There are typically many wavelets having a maximum amplitude. In general there are N wavelets located at depths $z_1, z_2, \ldots z_i, \ldots z_N$, where i designates the i th wavelet. For every successful pick test as described above, a depth of the neighboring trace is stored as being on a candidate local horizon. In other words, "1" bits are stored at the successful depths $z_i$ and simultaneously the depth of the neighboring trace at A, B, C, D is stored. Such storage may be represented as in TABLE I.

Independently, the above picking process is done for each three-by-three volume of traces in turn for each trace before validation. For example, the three-by-three volume of data centered at $x=2$, $y=1$ is processed according to the pick method described above. One ("1") bits are set at the z depths, labeled z' depths as illustrated in Table II. Like in TABLE I, the corresponding depths of side traces A, B, C, D are also stored as illustrated in TABLE II.

TABLE I

| Bits Set | Center Trace Depth | Corresponding Depths of side traces | | | |
|---|---|---|---|---|---|
| | ($x = 1, y = 1$) | | | | |
| 1 | $z_1$ | $zA_1$ | $zB_1$ | $zC_1$ | $zD_1$ |
| . | . | . | . | . | . |
| . | . | . | . | . | . |
| 1 | $z_i$ | $zA_i$ | $zB_i$ | $zC_i$ | $zD_i$ |
| . | . | . | . | . | . |
| . | . | . | . | . | . |
| 1 | $z_N$ | $zA_N$ | $zB_N$ | $zC_N$ | $zD_N$ |

TABLE II

| Bits Set | Center Trace Depth | Corresponding Depths of side traces | | | |
|---|---|---|---|---|---|
| | ($x = 2, y = 1$) | | | | |
| 1 | $z_1'$ | $z'A_1$ | $z'B_1$ | $z'C_1$ | $z'D_1$ |
| . | . | . | . | . | . |
| . | . | . | . | . | . |
| 1 | $z_i'$ | $z'A_i$ | $z'B_i$ | $z'C_i$ | $z'D_i$ |
| . | . | . | . | . | . |
| . | . | . | . | . | . |
| 1 | $z_N'$ | $z'A_N$ | $z'B_N$ | $z'C_N$ | $z'D_N$ |

3. Determination of Final Bit Volume

In the scanner method used during the "interactive phase" (described below), the depth of any bit might be used as a starting point in the search for a bit in a neighboring trace (e.g., the trace immediately to the north, south, east or west). If this search is successful, the original bit and the newly found bit are said to "belong" to the same horizon. The section above described selection of candidate bits which concerns how local horizons determined by seismic data are used to define bits.

The processing described in this section determines if each bit will produce the correct local horizon. If so, the bit is retained; if not, the bit is discarded. In this way the "final" bit volume can be guaranteed to faithfully reproduce the horizons as determined from the seismic data.

In view of such requirement and continuing with the example described above by reference to Tables I and II, the bits at the various depths $z'$ for the $x=2$, $y=1$ $3\times 3$ volume of data must be validated to insure that the "1" bits set at the $z'$ depths lie on a horizon as determined from the picking method for the $x=1$, $y=1$ $3\times 3$ volume of data. In other words, testing is performed to determine if the bit at $z_1'$ is within a predetermined distance from the bit at $z_i$ ($x=1$, $y=1$) and vice versa. Such validation proceeds as illustrated in TABLE III.

TABLE III

VALIDATE $z'$ PICKS (For example, $x = 2$, $y = 1$ $3 \times 3$ volume of data, by reference to $x = 1$, $y = 1$ $3 \times 3$ volume of data)

1.) Evaluate each $z_t'$ center trace bit in turn.
2.) For each center trace bit $z_t'$, find the closest center trace bit $z^*$ within "a" units of $z_t'$ in the z direction stored for the $x = 1$, $y = 1$ center trace. (See illustration of FIG. 7A). If no such bit exists, continue with next $z_t'$.
3.) Next determine if such center trace bit $z^*$ of $x = 1$, $y = 1$ is equal to side bit $z'$ $B_i$ of $x = 2$, $y = 1$.

TABLE III-continued

VALIDATE $z'$ PICKS (For example, $x = 2$, $y = 1$ $3 \times 3$ volume of data, by reference to $x = 1$, $y = 1$ $3 \times 3$ volume of data)

(See Table II) If it is, then the local horizon at $z_i$ for the $x = 1$, $y = 1$ $3 \times 3$ volume corresponds to the local horizon at $z_i'$ for the $x = 2$, $y = 1$. If it does not, then the bit set at $z_t'$ is turned off. (i.e. it is set equal to zero, "0".

Next, the bits at the various depths z for the $x=1$, $y=1$ $3\times 3$ volume of data must be validated to insure that there is one and only one horizon common between the bits set in z for $x=1$, $y=1$ and in $z'$ for $x=2$, $y=1$. TABLE IV demonstrates the method.

TABLE IV (VALIDATE ADJACENT LOCAL HORIZONS)

1.) For the $x = 1$, $y = 1$ bit trace, set $i = 0$, and increment i by 1 until all bits have been tested.
2.) For a bit $z_i$, fit the closest bit $z'^*$ on the center bit trace for $x = 2$, $y = 1$ within a distance a; that is, does a bit exist between $z' = z_t' \pm a$? (See FIG. 7B) If $z'^*$ does not exist, then set $i = i + 1$ and go to step 5 below.
3.) Is $z'^*$ equal to $zD_i$ (See Table I)? If yes, set $i = i + 1$, and go to step 6 below.
4.) If $z'^*$ is not equal to $zD_i$, then turn the bit at $z'^*$ to "0" and set i to h where h is the smallest index of any one bit greater than or equal to the depth $z'^* - a$.
5.) If no such i exists, exit this procedure.
6.) If i is less than the number of bits stored in $x = 1$, $y = 1$, then go to step 1 above.

The process continues for the entire first "line" of center trace $3\times 3$ volumes processed from left to right. That is, for line $y=1$, the bits set in z for $y=1$, $x=2$ are next processed according to the method outlined in tables I, II, III and IV, and then the bits set in z for $y=1$, $x=3$ are processed, etc., until the entire line is processed.

Figure 8:
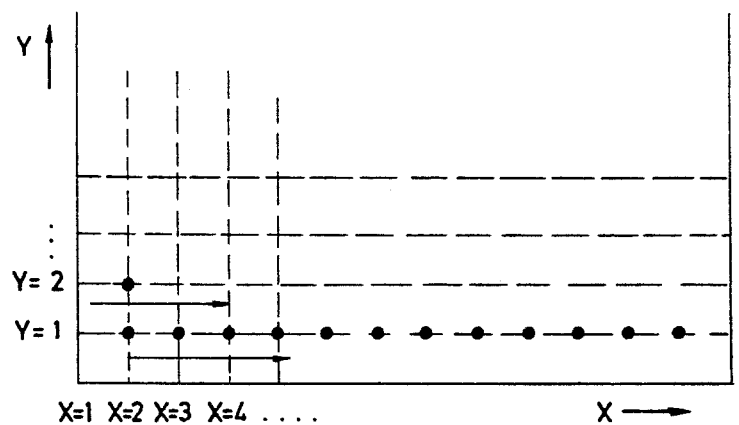
FIG. 8 illustrates testing procedures in the creation of a final bit volume by which bits set on depth points of center lines are tested with respect to neighboring bits both as to their east and west neighbors and also with respect to their north and south neighbors.

As illustrated in FIG. 8, the line $y=2$ is next processed and so on. For the $3\times 3$ volume at $y=2$, $x=1$, the z bits are processed according to the method outlined in Tables I to IV above by validating them with respect to z bits stored for $y=1$, $x=1$. In other words, a new Table II is produced for $x=1$, $y=2$. The new table II and table I are evaluated according to the method of Table III where the test looks for the bit $z'$ stored in new Table II for $x=1$, $y=2$ and then looks "south" to the $x=1$, $y=1$ table to see if the $z^*$ bit is equal to $z'C_i$. Next the new table II and table I are tested according to the method of Table IV where the bits in $x=1$, $y=1$ (Table I) are tested against the bits in $x=1$, $y=2$ (new table II) and looks north to see if the $z'^*$ bit is equal to the $zA_i$ bit of Table I.

Next the $3\times 3$ volume centered at $y=2$, $x=2$ is tested to the "south" with respect to the bits of volume centered at $y=1$, $x=2$ and to the "west" with respect to the bits of volume centered at $y=2$, $x=1$. The processing continues in this fashion until all the lines of the $3\times 3$ volume of data are processed.

The processing in the manner above insures that the bits on traces remaining in the final bit volume lie on local horizons which are within a predetermined depth distance of local horizons of adjacent traces. When subjected to the scanner described below horizons which are picked from such final bit volume are assured to be the same horizons which would be picked if working with the original seismic data. It should be emphasized that a separate final bit volume must be created in the batch phase for any characteristic desired for a horizon map. Separate bit volumes for peaks (maximum wavelet) or couple (minimum wavelet) must be produced.

INTERATIVE PHASE

Figure 9:
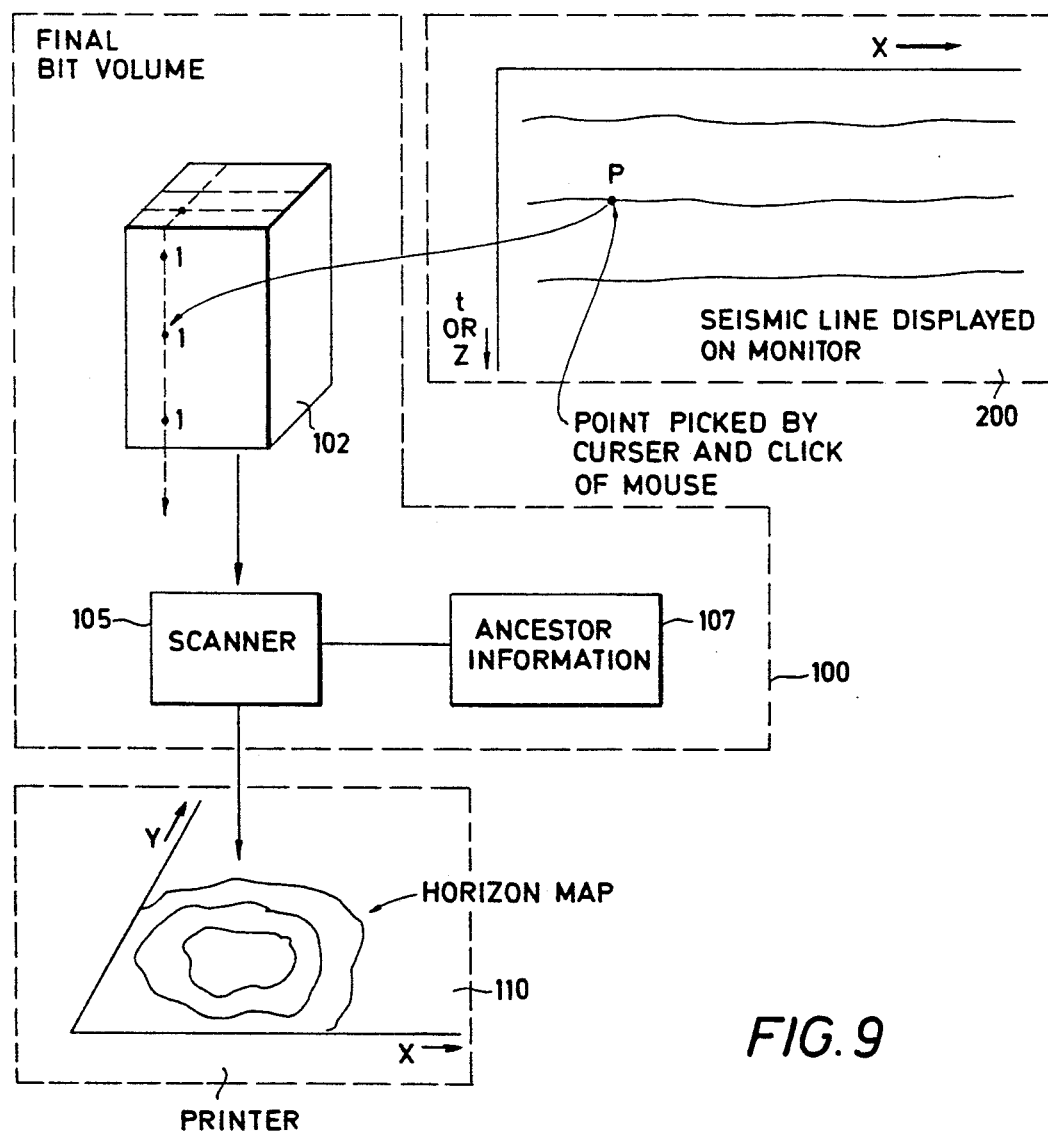
FIG. 9 schematically illustrates that after batch processing, a seed point is selected by a user where the seed point corresponds to a "1" bit in the final bit volume and illustrates the action of a scanner to produce a horizon map while retaining ancestor information useful in identifying and correcting map errors.

FIG. 9 illustrates the interactive phase of the invention after the batch phase has been completed. Of course, the final bit volume is loaded in RAM memory (or a portion of it depending on its size and the size of RAM memory), and a 2D seismic section may be displayed on a workstation monitor 200. A seed point is selected by the user, for example, by placing the mouse cursor at point P and clicking the mouse. The mouse click creates x, y and depth (z) information which corresponds to a particular 1 bit of the final bit volume 102 stored in RAM memory of computer. Next, a 3D automatic picking method or "SCANNER" 105 is used to pick other 1 bits in the final bit volume that define a horizon. Such bits correspond to the common attribute such as maximum wavelet amplitude.

DESCRIPTION OF THE SCANNER

Scanner 105 is preferably embodied as a computer program stored in RAM memory 100 which operates on final bit volume 102 to produce a horizon map 110. Table V below describes the operation of the scanner. The scanner places the initial seed point and other selected x, y, z points which become seed points through processing in a "QUEUE". Each seed point of the "QUEUE" is tested in turn. Through the scanning process, the x-y coordinates of the horizon map 110 are assigned with z values or "depths" which are on the same bedding plane or "horizon" as the seed point.

TABLE V
(SCANNER)

Step 1.) Initiatization: The seed point is put into an empty queue. The horizon map is set to an "empty state" for each x, y corrdinate. That is, the z coordinate for each x, y point of the map is set to zero.

Step 2.) The first seed point x, y, z is removed from the queue. As a result, the queue becomes one point shorter. If there is no point in the queue, then scanning stops.

Step 3.) The point x, y, z from the queue is used to search in the z direction for a "1" bit in the final bit volume. For an aperture of two depth units (such aperture must be the same as used in the batch process), the search continues down one depth unit, up two depth units, down three depth units and up four depth units. If a "1" bit is found, for example at x, y, z', then an entry of z' is made in the map 110 at location x, y and processing passes to step 4 below.
If no "1" bit is found within such aperture, the processing passes to step 2 above.

Step 4.) Each of the four "map" directions from the x, y, point is then processed. Such directions are to the "north" (x, y + 1), "south" (x, y − 1), "east" (x + 1, y), and "west" (x − 1, y).
For each of these map directions, the map is checked to see if a z coordinate has already been assigned to it. If it has, nothing happens and the next "direction" point is checked. If the new point is in the "empty state", then a three dimensional coordinate is placed at the end of the QUEUE containing the location of the empty map coordinate and the z' value found in step 3.
For example, if (x, y, z') are the coordinates of the "1" bit located in step 3, and the (x, y − 1) map location is empty, then the point ($x_1$, y − 1, z' is placed at the end of the QUEUE (and similarly for (x, y + 1), (x − 1, y) and (x + 1, y).

TABLE V-continued
(SCANNER)

After step 4 is complete, the processing passes to step 2.

Figure 10:
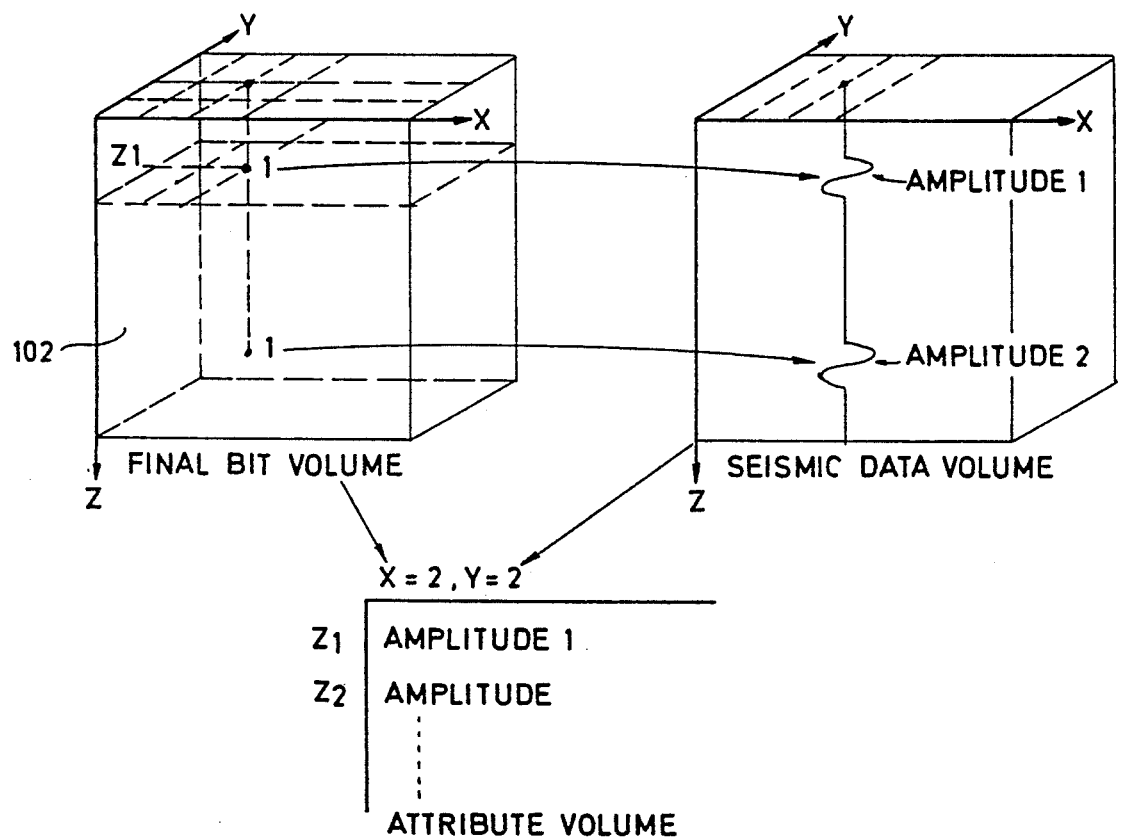
FIG. 10 illustrates the creation of an attribute volume of attribute values which correspond to the on or "1" bits of the final bit volume.

The scanner process stops when it cannot expand and add any more z locations where 1 bits are stored in the final bit volume. When the scanning process stops, depth points have been added to the horizon map through which there exists a path from the original seed point to any point determined from it. In other words, it is possible to trace a path from the seed point to every other point added to the horizon map, such that adjacent points on the path do not differ by more than the aperture distance ("a" depth units as illustrated in FIG. 10) in their z values.

RECORDING ANCESTOR INFORMATION

As the scanner "explodes" outwardly in all north, south, each and west directions from seed points, a record is maintained for each selected adjacent point as to the parent point which led to its selection. For example, the seed point a x, y may lead to the selection of the points x+1, y; x, y+1; x−1, y−1; and x, y-1. The x, y point is the ancestor of all four of such points. Likewise the point at x+1, y may lead to the selection of x+2, y; x+1, y+1; and x+1, y−1. The point of x+1, y; is the ancestor of x+2, y; x+1, y+1; and x+1. Of course the point at x, y is the ancestor of all such points mentioned above. Such ancestor information is stored in memory 107 (FIG. 9) as the horizon map 110 is generated.

EDITING BASED ON RECORDED ANCESTOR INFORMATION

During batch tracking as illustrated by FIGS. 5, 6A, 6B, 7A, 7B and 8 and Tables I-IV, faults in the earth may not be recognized and the tracking may "jump" across a fault from one sedimentary layer or horizon to another. When the scanning of the final bit volume is done, the scanning likewise does not recognize a fault and continues to track to a new horizon, i.e., a different sedimentary layer than that of the seed point.

It is desirable that any points picked which are not on the horizon of the seed point be removed and that removed portion be rescanned.

Improper horizon regions can be identified by visual inspection by an interpreter viewing the horizon map 110 of FIG. 9. Sudden changes in depth in the map may indicate to the interpreter that certain points of the map have been improperly selected.

Using the ancestor information stored in module 107, the user can display the path or paths back to the seed point for any given descendant point. Visual inspection of a path or paths either on the horizon map 110 or a seismic section may identify the point at which the scanner 105 crossed a fault. Deleting all descendants of the point at which the scanner crossed faults removes those entries from the horizon map. The deleted region may then be rescanned by designating a new seed point in the region.

CREATING AN ATTRIBUTE VOLUME

An explorationist (such as a geophysicists) often desires to look at the maximum (or minimum) values of the seismic wavelets which correspond to a horizon map. Such information may aid the user in the interpretation of the seismic data. Such "attribute" or other attributes may be stored in a volume which corresponds to the final bit volume. It is advantageous to store only those attributes which correspond to the on or "1" bits in the final bit volume. Since due to sampling the true maximum or minimum (or perhaps the zero crossing point) of a wavelet may be not be identified, such true attribute corresponding to "1" bits of the final bit volume may be found by interpolation in the batch process.

FIG. 11 illustrates schematically the process by which each "z" dimension for each x, y trace has its amplitude stored. Each on or "1" bits of the final bit volume has, an x, y, z location which corresponds to an amplitude of the wavelet in the seismic data volume. Such amplitude is stored contiguously, as a function of the z dimension of the "1" bits in the attribute volume.

Because only about ten percent of the depth points in the final bit volume have an on or "1" bit, the attribute volume is likewise about ten percent of the size of the original seismic data volume. Such fact makes it possible to read more of the horizon amplitudes into memory resulting in faster displays which result from computation based on horizon amplitudes.

Various modifications and alterations in the described methods and apparatus will be apparent to those skilled in the art of the foregoing description which does not depart from the spirit of the invention. For this reason, these changes are desired to be included in the appended claims. The appended claims recite the only limitation to the present invention. The descriptive manner which is employed for setting forth the embodiments should be interpreted as illustrative but not limitative.

What is claimed is:

1. A method of automatically selecting horizons of formations from a three-dimensional volume of seismic data traces comprising the steps of, first
    (a) converting each of said seismic data traces to a bit trace defined by a sequence of 0 and 1 bits as a function of depth, where a "1" at a depth of a trace indicates that a horizon exists at that depth and a "0" indicates that a horizon does not exist at that depth, and
    (b) storing each of said bit traces in the memory of a computer as a three-dimensional bit volume of bits traces, and later
    (c) selecting a seed bit on a bit trace in said bit volume which falls on a particular horizon, and
    (d) automatically scanning said particular horizon through said bit volume by starting with said seed bit, and picking 1 bits on adjacent bit traces of said bit volume which lie on said particular horizon.

2. The method of claim 1 wherein said converting step includes the sub-steps of:
    (1) for certain seismic data traces in said three-dimensional volume of seismic data traces with each such data trace being in turn designated a test data trace, determining the test depth points of a characteristic of a wavelet of said test seismic data trace,
    (2) for each test data trace, identifying a test volume of seismic data traces including said test data trace in its center and four side seismic data traces, and
    (3) determining if a local horizon exists through each of said test depth points of said test seismic data trace by requiring that a depth point be picked on each of said four side seismic data traces which correspond to said wavelet characteristic at a corresponding depth of said test depth point.

3. The method of claim 2 wherein picking of depth points of side traces includes progressing from a beginning trace to a target trace comprising the steps of
    (i) recording a numerical value of said characteristic of a beginning wavelet at a beginning depth point of said beginning trace,
    (ii) transferring the depth of said beginning depth point to said target trace and finding the depth point of said characteristic of the wavelet of said target trace that exists between zero crossings of said target trace and recording said depth point and a numerical value of said characteristic of said target trace wavelet, and
    (iii) transferring the depth of said depth point of said target trace back to said beginning trace to determine if it is between zero crossings of said wavelet of said beginning trace, and if it is,
    (iv) requiring that the difference between said numerical value of said characteristic of said beginning trace wavelet and said target trace be within a predetermined numerical amount.

4. The method of claim 2 further including the sub-step of
    comparing picked depth points z of the center trace of each test volume V with depth points z' of the center trace of adjacent test volumes V' such that each picked depth point z' of the center trace of adjacent test volumes V' are within a predetermined depth of a depth point z of the test volume V and that the depth of depth point z' of an adjacent test volume V' is the same depth as a corresponding side seismic data trace of said depth point z of said test volume V.

5. The method of claim 1 wherein said certain seismic data traces are all seismic data traces which may serve as a center trace of a three-by-three volume of data traces of said three-dimensional volume of seismic data traces.

6. The method of claim 2 wherein said characteristic of a wavelet of said test seismic data trace is the maximum amplitude of said wavelet.

7. The method of claim 2 wherein said characteristic of a wavelet of said test seismic data trace is the minimum amplitude of said wavelet.

8. The method of claim 1 wherein said step of automatically scanning said particular horizon through said bit volume by starting with said seed bit and picking 1 bits on adjacent bit traces of said bit volume includes the steps of
    (1) beginning with said seed bit on said bit trace, identifying the same depth as said seed bit on adjacent bit traces, and
    (2) searching said adjacent bit traces to find bits within a predetermined depth as the depth of said seed bit,
    (3) designating any found bit of an adjacent bit trace as being on the same horizon as said seed bit, and designating such found bit as a seed bit, and
    (4) repeating steps (1), (2) and (3) above except for searching bit traces already searched, until no more bits or adjacent bit traces can be found.

9. The method of claim 8 wherein said bit pattern as a function of depth is plotted on an x-y pattern with changes in depth thereof parametrically displayed.

10. The method of claim 8 further comprising the step of recording each seed bit as a parent bit, and for each said found bit of an adjacent bit trace, recording said found bit as being a child of said parent bit.

11. The method of claim 1 further comprising the steps of determining a numerical value of an attribute of said seismic data traces at each depth at which is a 1 is recorded, and recording said numerical values as a function of depths at which such 1's are recorded.

12. In a method of automatically picking horizons from a three dimensional volume of seismic data traces, a method of creating a bit volume comprising the steps of converting said seismic data traces to a bit trace defined by a sequence of 0 and 1 bits as a function of depth, where a "1" at a depth of a trace indicates that a horizon exists at that depth and a "0" indicates that a horizon does not exist at that depth, and storing each of said bit traces in the memory of a computer as a three dimensional bit volume of bit traces.

13. The method of claim 12 further comprising the steps of interactively selecting a seed bit on a bit trace in said bit volume which falls on a horizon, and scanning said horizon through said bit volume by starting with said seed bit, and picking 1 bits on adjacent bit traces of said bit volume which lie on said horizon.

14. In a method of automatically picking horizons from a three dimensional volume of seismic data traces, where a horizon is a bedding interface in the earth's crust and is represented in said seismic data traces through said bedding interface by a common attribute of a seismic wavelet, and where said common attribute may vary in depth as a function of x-y coordinates of said seismic data traces, a method of creating an indicia volume comprising the steps of converting each of said seismic data traces to an indicia trace defined by a sequence of a first indicium and a second indicium as a function of depth, where a first indicium at any depth of such indicia trace indicates that a horizon exists at such depth of said seismic data trace and a second indicium at any depth of such indicia trace indicates that a horizon does not exist at such depth of said seismic data trace, and storing each of said indicia traces in the memory of a computer as a three-dimensional indicia volume of indicia traces.

15. The method of claim 14 wherein said first indicium is a "1" bit and said second indicium is a "0" bit.

* * * * *